United States Patent

Bostelmann et al.

[11] Patent Number: 5,794,574
[45] Date of Patent: Aug. 18, 1998

[54] SYSTEM FOR REVERSING 2 STROKE ENGINE

[75] Inventors: Willy Bostelmann, Wels, Austria; Roger Rioux, Magog; Benoit Pion, Valcourt, both of Canada

[73] Assignee: Bombadier Inc., Montreal, Canada

[21] Appl. No.: 721,099

[22] Filed: Sep. 27, 1996

[51] Int. Cl.⁶ .................................................. F01L 13/02
[52] U.S. Cl. ............................... 123/41 E; 123/65 R
[58] Field of Search .......................... 123/41 R, 41 E, 123/65 R

[56] References Cited

U.S. PATENT DOCUMENTS

| | | | |
|---|---|---|---|
| 5,036,802 | 8/1991 | D'Amours | 123/65 R |
| 5,224,448 | 7/1993 | Kandler | 123/198 D |

FOREIGN PATENT DOCUMENTS 2012027  9/1991  Canada.

*Primary Examiner*—David A. Okonsky
*Attorney, Agent, or Firm*—Fish & Richardson P.C.

[57] ABSTRACT

A system for reversing the direction of a two-stroke, internal combustion engine provided with a spark ignition system, the engine having at least one cylinder and a piston reciprocating therein and connected to drive a rotary crankshaft, the system comprising: a manually operable inverse command button; trigger means located proximate a rotary member driven by the crankshaft, a cooperating member carried on the rotary member and cooperating with the trigger means as the rotary member rotates to generate a train of pulses; means detecting the direction of rotation of the crankshaft and generating a direction signal indicative of direction of rotation; a microprocessor control unit receiving the train of pulses, the direction signal and an output from the inverse command button and connected to control the spark ignition system, the microprocessor monitoring the speed and direction of rotation of the rotary member on the basis of the train of pulses and the direction signal, the microprocessor operable when the inverse command button is pushed to 1) stop ignition thereby causing the engine to slow down, 2) when the engine speed falls below a predetermined level momentarily generate an ignition spark at an angle sufficiently in advance of top dead center to reverse the direction of rotation of the crankshaft, and 3) when the engine is reversed continue ignition at an appropriate timing for reverse rotation.

13 Claims, 4 Drawing Sheets

5,794,574

SYSTEM FOR REVERSING 2 STROKE ENGINE

FIELD OF THE INVENTION

This invention relates to a system for reversing internal combustion engines.

BACKGROUND OF THE INVENTION

Canadian Patent No. 2,012,027 which issued on Apr. 23, 1996 to Bomardier Inc., relates to a reversible internal combustion engine in which there is no reverse gear. Changing the direction of rotation of the engine is carried out by monitoring the speed and direction of rotation of the engine, stopping ignition of the engine thereby allowing the engine speed to drop below a predetermined value, restarting the ignition at a sufficiently advanced angle BTDC that the forces generated in the engine cylinder are high enough to reverse the direction of the piston before it reaches TDC and continuing with the ignition at a less advanced angle after reversal has been achieved to keep the engine rotating in the reverse direction.

SUMMARY OF THE INVENTION

The specific manner described for monitoring the speed and direction of the engine involves monitoring the output voltage of a magneto forming part of the engine.

While that is an acceptable way of achieving the monitoring, it is an object of the present invention to provide another monitoring arrangement and, in particular, one which can be used to retrofit an existing engine.

Another object of the present invention is to provide an improved electronic ignition system, to allow reversal of the rotational direction of an internal combustion engine of two-stroke type, which can allow a finer control of the operation being fully and reliably managed in its entirety by a microprocessor.

In particular, an object of the present invention is to provide microprocessor controlled ignition system, to allow reversal of the rotational direction of an engine, which is not only extremely reliable and safe in use, i.e., is able to recognize the direction of rotation and the operating conditions of the engine both when running and during a reversal transient, but which can also be easily adapted to a two-stroke engine, being of small dimensions and low cost.

According to one aspect, the present invention provides a system for reversing the direction of a two-stroke internal combustion engine provided with a spark ignition system powered by a voltage derived from a magneto, the engine having at least one cylinder and a piston reciprocating therein and connected to drive a rotary crankshaft, the system comprising: a manually operable inverse command button; trigger means located proximate a rotary member driven by the crankshaft, a cooperating member carried on the rotary member and cooperating with the trigger means as the rotary member rotates to generate a train of pulses separate and distinct from the magneto voltage; means detecting the direction of rotation of the crankshaft and generating a direction signal indicative of direction of rotation; a microprocessor control unit receiving the train of pulses, the direction signal and an output from the inverse command button and connected to control the spark ignition system, the microprocessor monitoring the speed and direction of rotation of the rotary member on the basis of the train of pulses and the direction signal, the microprocessor operable when the inverse command button is pushed to 1) stop ignition thereby causing the engine to slow down, 2) when the engine speed falls below a predetermined level momentarily generate an ignition spark at an angle sufficiently in advance of top dead center to reverse the direction of rotation of the crankshaft, and 3) when the engine is reversed continue ignition at an appropriate timing for reverse rotation.

BRIEF DESCRIPTION OF THE DRAWINGS

The invention will now be described in greater detail with reference to the accompanying drawings, in which.

DESCRIPTION OF THE PREFERRED EMBODIMENTS

Figure 1:
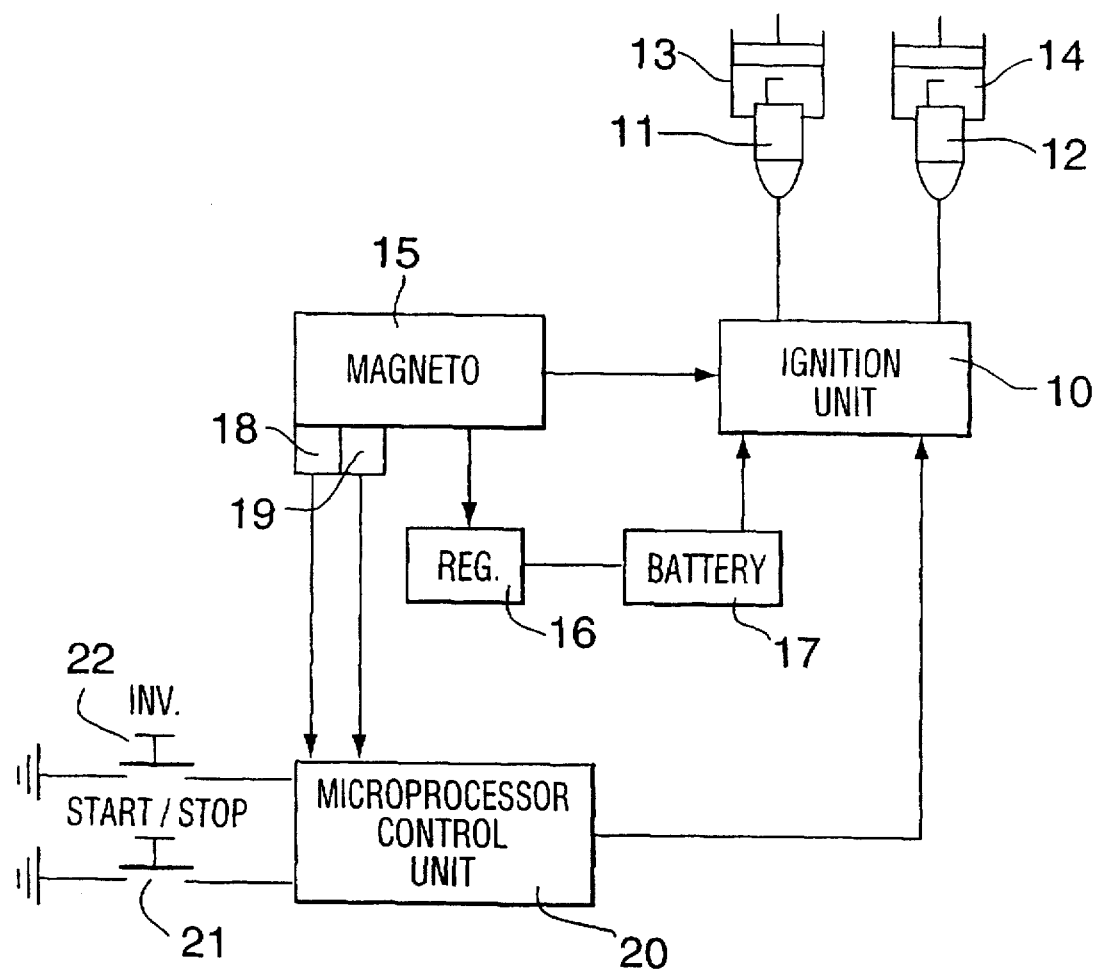
FIG. 1 is a schematic block diagram illustrating the electrical circuitry of the invention.

With reference to FIG. 1, the electrical circuitry for a two cylinder 180° two stroke internal combustion engine comprises an ignition unit 10 which powers spark plugs 11 and 12 of the respective cylinders 13 and 14. A magneto 15 is mechanically coupled to the pistons 24 and 25 of the cylinders through a crankshaft (not shown) such that the rotor of the magneto is rotated. The electrical output of the magneto passes through a regulator 16 to a battery 17 which is in turn connected to the ignition unit 10.

Attached to the magneto 15 is a pair of pulse generating trigger coils 18 and 19 the outputs of which are connected to a microprocessor control unit 20 which is connected to the ignition unit 10 and has two inputs, one connected to a START/STOP button 21 and the other connected to an INVERSE Command button 22.

Figure 2A:
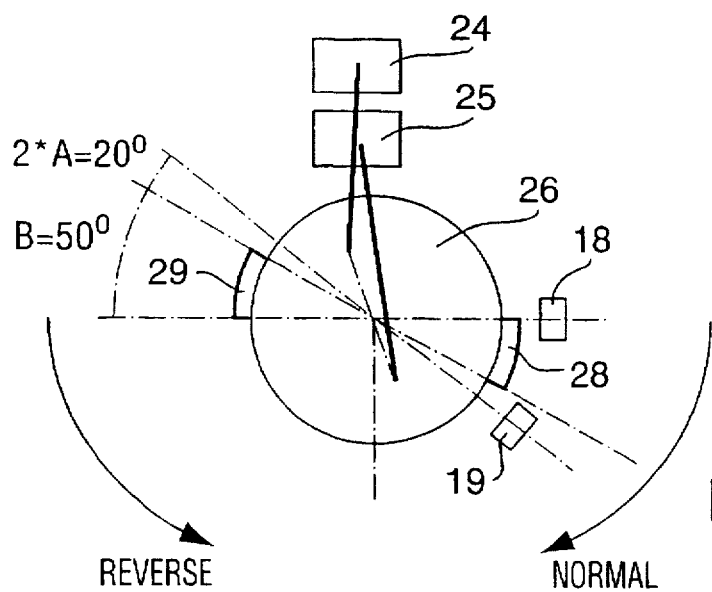
FIG. 2a is a schematic diagram illustrating pulse generating triggers for a two cylinder engine.

Referring now to FIG. 2a, pistons 24 and 25 of cylinders 13 and 14 are shown mutually displaced 180° and their positions relative to the angular rotation of the rotor 26 of magneto 15 is also shown. Provided on the rotor are two arcuate diametrically opposed metallic teeth 28 and 29. The tooth 28 corresponds to cylinder 13 and the tooth 29 corresponds to cylinder 14. If the engine had three cylinders there would be a third metallic tooth and the spacing between the teeth would be 120° instead of 180°.

Mounted adjacent the periphery of the rotor 26 is the pair of trigger coils 18 and 19. The spacing between the trigger coils is 70° and the arcuate length of each tooth is 50°.

Figure 3A:
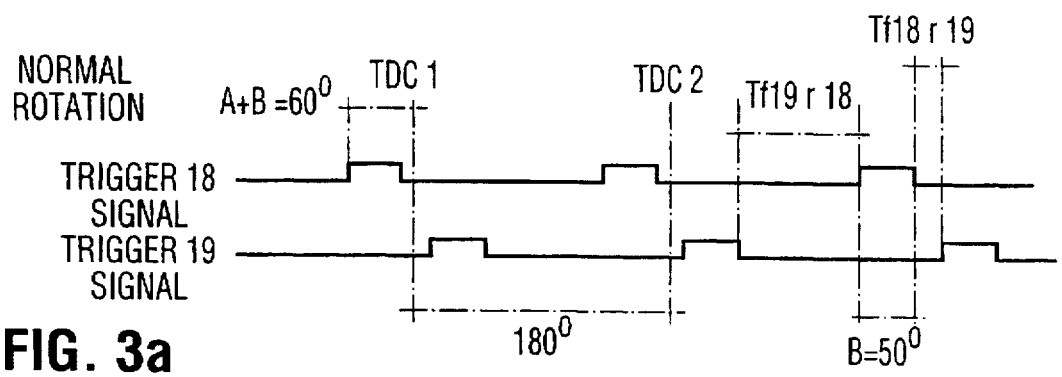
FIGS. 3a and 3b illustrate the waveforms obtained from the pulse generating triggers for normal and reverse rotation respectively.
Figure 3B:
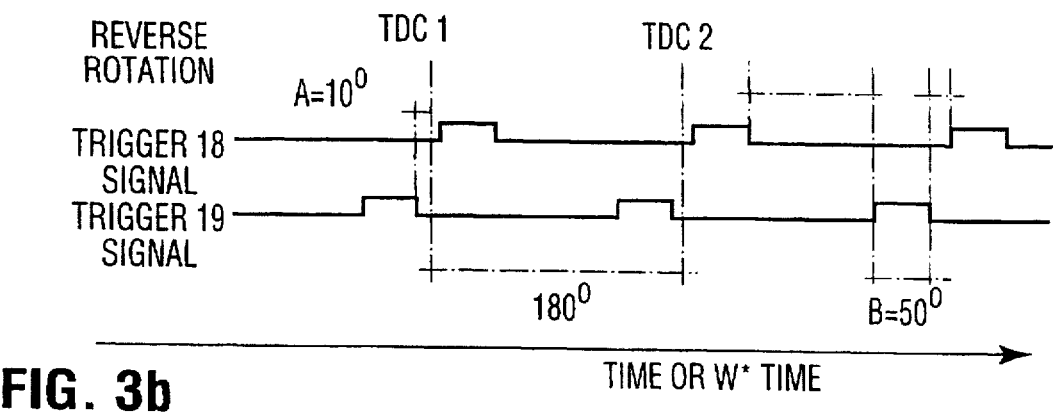

FIGS. 3a and 3b illustrate the magnetically induced waveforms that are generated by trigger coils 18 and 19 as teeth 28 and 29 pass. A series of square pulses each 50° long is generated by each trigger coil. The pulses of trigger coil 18 are 20° apart from the corresponding pulses of trigger coil 19 and the TDC positions for each cylinder are located halfway between the pulses.

IT can be appreciated that if the time between the falling edge of each pulse from trigger coil 19 and the rising edge of the corresponding pulse from trigger coil 18 is greater than the time between the falling edge of each pulse from trigger coil 10 and the rising edge of the corresponding pulse from trigger coil 19, the rotation will be in the Normal direction. Otherwise, rotation will be Reverse. This can be summarised as:

$Tf19r18 > Tf18r19 = Normal$ $Tf18r19 > Tf19r18 = Reverse$

The microprocessor control unit 20 is configured such that if the START/STOP button 21 is pressed when the engine is stopped, the control unit gives a command to a starter motor (not shown) to turn over the engine and at the same time sends an ignition command to the ignition unit 10 which supplies sparks to spark plugs 11 and 12 thereby starting the engine. The pulses generated by trigger coil 18 are used as a phase reference for ignition timing. These pulses, as can be seen from FIG. 3a, have a rising edge at 60° BTDC. The microprocessor control unit 20 incorporates delay circuitry triggered by the rising edges of the pulses such that a delay of 50° is obtained which has the effect that under normal running ignition is advanced 10°.

When the operator wants to reverse the engine, he presses the Inverse button 22. This controls logic circuitry in the microprocessor control unit 20 to carry out the following automatic steps:

1) The ignition command sent to ignition unit 10 is stopped thereby causing the engine to slow down.

2) When the speed of the motor falls below a predetermined r.p.m., typically between 300 and 700 rpm, e.g., 600 rpm, an ignition command is again sent from microprocessor control unit 20 to ignition unit 10. The delay circuitry is again triggered by the rising edge of the pulses from trigger coil 18 but a much smaller delay is inserted to provide an ignition command at between 30° and 55° BTDC. This causes reversal of the direction of rotation of the crankshaft and magneto.

3) The pulses generated by the trigger coil 19 are now used as a phase reference for ignition timing in the reverse direction. The delay circuitry in the microprocessor control unit 20 is triggered by the rising edges of these pulses such that a delay of 50° is obtained which has the effect of reducing the advance to 10° BTDC. This amount of advance is merely exemplary; other advances may be appropriate in certain cases to maintain rotation. The amount of advance can be different in normal running condition and in the reverse direction for example to take into account certain factors such as the friction within the engine, the type of engine, etc.

In the above described sequence of events the speed of the engine is monitored by measuring the time between successive pulses from trigger coil 19 or 19 and the direction is monitored by comparing $Tf19r18$ and $Tf18r19$ as indicated above.

In order to return the engine to forward normal running direction, the operator again presses the Inverse button 22 and the same sequences of steps 1), 2) and 3) occurs but in step 2) the pulses from trigger coil 19 are used as a phase reference while in step 3) the pulses from trigger coil 18 are used as a phase reference.

As described, the direction of rotation is determined by monitoring $Tf19r18$ and $Tf18r19$ but it is envisaged that other means for determining direction of rotation could be used. In such a case, it would not be necessary to generate two pulse trains and so only one trigger coil would be necessary. The speed of rotation would, as before, be monitored using this pulse train.

In the particular embodiment described, the pulse generating triggers are coils actuated by the passage of metallic teeth. However, mechanical cam operated trigger switches or optical trigger switches could be used instead.

Figure 2B:
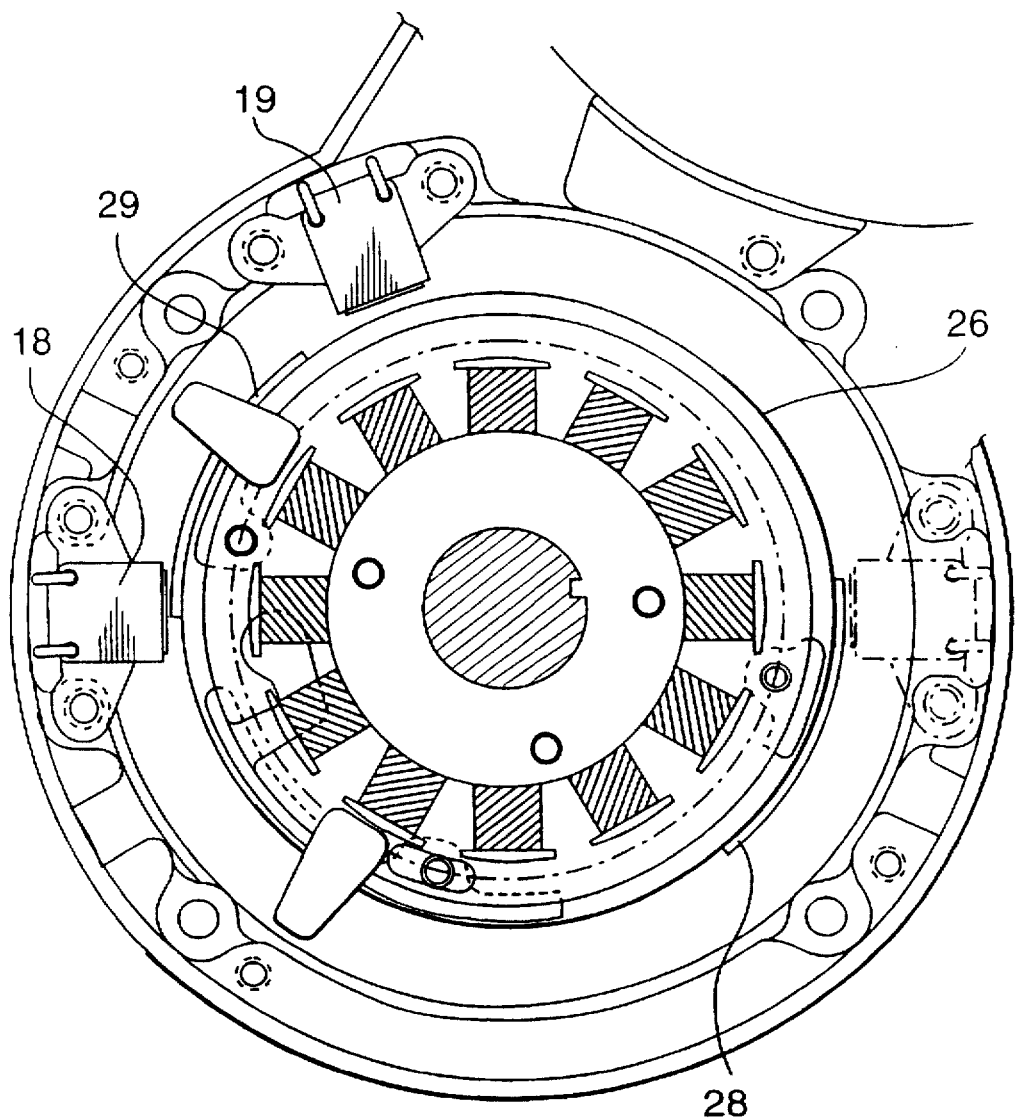
FIG. 2b is a more detailed schematic of an embodiment of the invention.

Referring now to FIG. 2b, a more detailed schematic of an embodiment of the invention is shown in which slightly different angles have been used, as indicated.

Reference may be made to FIGS. 4a to 4d which illustrate the use of mechanical cam operated trigger switches. Instead of metallic teeth 28 and 29 this embodiment uses two 180° spaced double acting trigger cams 34 and 35 each 45° in arcuate length. Instead of the inductively operated trigger coils 18 and 19 two spaced mechanically operated trigger coil switches 36 and 37 are provided. The spacing between switches 36 and 37 is 25° and each is arranged to be operated by an advancing edge of each cam 34, 35. Thus when the camshaft is rotating in one direction one edge of each cam 34, 35 operates the switches and when the camshaft is rotating in the other direction with other edge of each cam operates the switches.

The TDC position of the pistons is illustrated and the position of one of the pistons is indicated by a circle 30 just at the point that an advancing edge of one of the cams is activating one of the switches.

Figure 4A:
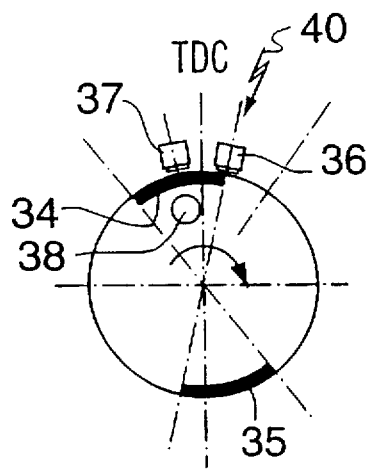
FIGS. 4a and 4d illustrate schematically the operation of another embodiment of the invention.

As with the first embodiment described two pulse trains are generated in the forward rotational direction and two pulse trains are generated in the reverse direction. These pulse trains could be fed into a microprocessor and processed in a manner similar to that previously described. Alternatively, the circuitry can be arranged to activate only one of the trigger coils at any one time and use the pulses of a particular train to cause ignition without the introduction of a delay. This alternative aspect is illustrated in FIGS. 4a to 4d. FIG. 4a illustrates the situation in which the engine is rotating in the forward direction as indicated by the arrow. The advancing edge of cam 34 is engaging switch 36 when the piston is 10° BTDC. As indicated by the lightning arrow 40 only the coil switch 36 is activated which means that no pulses are generated by switch 37 when it is engaged by the advancing edge of cam 34. The pulses generated at 10° BTDC by switch 36 are used without delay to cause ignition at 10° BTDC.

As with the first embodiment to reverse rotation ignition is stopped causing the engine to slow down and switch 36 is deactivated and switch 37 is activated. Thus switchover of activation of switch 36 to 37 is achieved by means of a selector switch (not shown) which automatically kicks in when ignition is stopped.

Figure 4B:
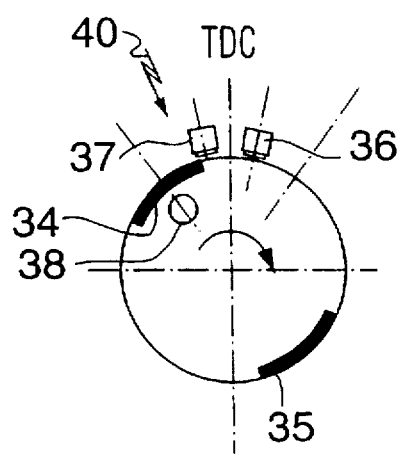

FIG. 4b illustrates the situation when the engine speed has dropped to about 600 rpm at which time ignition is again started with the leading edge of cam 34 operating the switch 37 to cause ignition timing 35° BTDC to effect kickback and engine reversal.

Figure 4C:
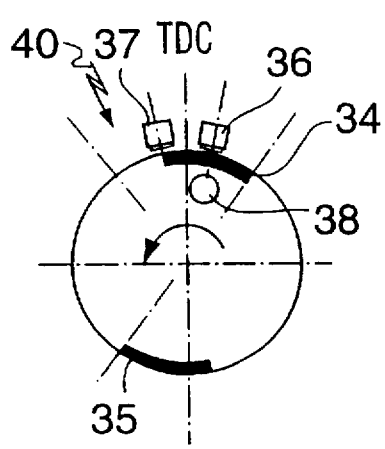

FIG. 4c illustrates the relative angular positions just after kickback. With switch 37 still activated by the selector switch the other edge of cam 34 becomes the advancing edge and operates switch 37 at 10° BTDC to continue reverse rotation.

To cause the engine to revert to its original rotational direction, ignition is again stopped and the selector switch activates switch 36.

Figure 4D:
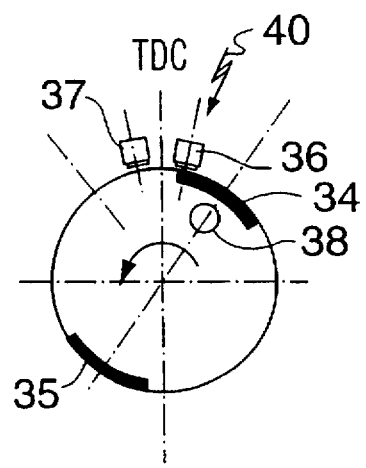

FIG. 4d illustrates the situation when the engine speed has dropped to about 600 rpm at which time ignition is again started with the leading edge of cam 34 operating the switch 36 to cause ignition timing 35° BTDC to effect kickback and engine reversal.

Although the triggers are in the embodiments described above arranged in relation to the magneto rotor they could be located in relation to any other part of the engine such as a flywheel which is rotated by the crankshaft. However, the arrangement of the triggers in relation to the magneto rotor is preferred because it provides a very simple way of retrofitting an engine. The teeth are easily mounted on the rotor and the trigger coils easily mounted close to the rotor.

In addition to the functions described above the microprocessor may have other functions and control features. For example, it may be arranged to receive information on temperature and atmospheric pressure and adjust the ignition advance appropriately.

We claim:

1. A system for reversing the direction of a two-stroke, internal combustion engine provided with a spark ignition system powered by a voltage derived from a magneto, the engine having at least one cylinder and a piston reciprocating therein and connected to drive a rotary crankshaft, the system comprising:

a manually operable inverse command button;

trigger means located proximate a rotary member driven by the crankshaft;

a cooperating member carried on the rotary member and cooperating with the trigger means as the rotary member rotates to generate a train of pulses separate and distinct from the magneto voltage;

means detecting the direction of rotation of the crankshaft and generating a direction signal indicative of direction of rotation;

a microprocessor control unit receiving the train of pulses, the direction signal and an output from the inverse command button and connected to control the spark ignition system, the microprocessor monitoring the speed and direction of rotation of the rotary member on the basis of the train of pulses and the direction signal, the microprocessor operable when the inverse command button is pushed to
1) stop ignition thereby causing the engine to slow down,
2) when the engine speed falls below a predetermined level momentarily generate an ignition spark at an angle sufficiently in advance of top dead center to reverse the direction of rotation of the crankshaft, and
(3) when the engine is reversed continue ignition at an appropriate timing for reverse rotation.

2. A system according to claim 1 wherein the trigger means is a trigger coil and the cooperating member is a metallic tooth inductively linking the trigger coil as the rotary member rotates.

3. A system according to claim 1 wherein the trigger means is a mechanical switch and the cooperating member is arranged to engage and operate the switch as the rotary member rotates.

4. A system according to claim 3 wherein the cooperating member is a double acting cam.

5. A system for reversing the direction of a two-stroke, internal combustion engine provided with a spark ignition system powered by a voltage derived from a magneto, the engine having at least one cylinder and a piston reciprocating therein and connected to drive a rotary crankshaft, the system comprising:

a manually operable inverse command button;

a pair of triggers spaced a predetermined angular distance apart in relation to a rotary member driven by the crankshaft;

a cooperating member carried on the rotary member and cooperating with the pair of triggers as the rotary member rotates to generate two trains of pulses separate and distinct from the magneto voltage;

a microprocessor control unit receiving the two trains of pulses and an output from the inverse command button and connected to control the spark ignition system, the microprocessor monitoring the speed and direction of rotation of the rotary member on the basis of the two trains of pulses, the microprocessor operable when the inverse command button is pushed to
1) stop ignition thereby causing the engine to slow down,
2) when the engine speed falls below a predetermined level monetarily generate an ignition spark at an angle sufficiently in advance of top dead center to reverse the direction of rotation of the crankshaft, and
3) when the engine is reversed continue ignition at an appropriate timing for reverse rotation.

6. A system according to claim 5 wherein the pair of triggers is a pair of trigger coils and the cooperating member is a metallic tooth inductively linking the trigger coils as the rotary member rotates.

7. A system according to claim 5 wherein the pair of triggers is a pair of mechanical switches and the cooperating member is arranged to engage the switches as the rotary member rotates.

8. A system according to claim 7 wherein the cooperating member is a double acting cam.

9. A reversing system kit for retrofitting a two stroke internal combustion engine to provide an engine reversing function, the engine having at least one cylinder and a piston reciprocating therein and connected to drive a rotary crankshaft and having a spark ignition system, the kit comprising:

a manually operable inverse command button;

a pair of triggers for mounting a predetermined angular distance apart in relation to a rotary member driven by the crankshaft;

a cooperating member for mounting on the rotary member to cooperate with the pair of triggers as the rotary member rotates to generate two trains of pulses, a microprocessor control unit for connecting to the spark ignition system to control the spark ignition system, the microprocessor control unit having inputs for receiving the two trains of pulses and an output from the inverse command button, the microprocessor monitoring the speed and direction of rotation of the rotary member on the basis of the two trains of pulses, the microprocessor operable when the inverse command button is pushed to
1) stop ignition thereby causing the engine to slow down,
2) when the engine speed falls below a predetermined level momentarily generate an ignition spark at an angle sufficiently in advance of top dead center to reverse the direction of rotation of the crankshaft, and
3) when the engine is reversed continue ignition at a smaller advance angle.

10. A system according to claim 2 wherein the metallic tooth is mounted on a rotor of the magneto and the trigger coil is physically attached to a stator of the magneto.

11. A system according to claim 4 wherein the cam is mounted on a rotor of the magneto and the mechanical switch is physically attached to a stator of the magneto.

12. A system according to claim 6 wherein the metallic tooth is mounted on a rotor of the magneto and the trigger coils are physically attached to a stator of the magneto.

13. A system according to claim 8 wherein the cam is mounted on a rotor of the magneto and the mechanical switches are physically attached to a stator of the magneto.

* * * * *